US008825338B2

(12) United States Patent
Braier et al.

(10) Patent No.: US 8,825,338 B2
(45) Date of Patent: Sep. 2, 2014

(54) CONTROLLER FOR A DRIVE SYSTEM

(75) Inventors: Ran Braier, Shoham (IL); Arie Perry, Hod Hasharon (IL)

(73) Assignee: Israel Aerospace Industries Ltd., Lod (IL)

( * ) Notice: Subject to any disclaimer, the term of this patent is extended or adjusted under 35 U.S.C. 154(b) by 0 days.

(21) Appl. No.: 13/700,874

(22) PCT Filed: May 30, 2011

(86) PCT No.: PCT/IL2011/000416
§ 371 (c)(1),
(2), (4) Date: Nov. 29, 2012

(87) PCT Pub. No.: WO2011/151816
PCT Pub. Date: Dec. 8, 2011

(65) Prior Publication Data
US 2013/0110336 A1 May 2, 2013

(30) Foreign Application Priority Data

May 30, 2010 (IL) .......................... 206061

(51) Int. Cl.
*B60T 8/32* (2006.01)
*B60K 31/00* (2006.01)
*B60W 30/188* (2012.01)
*F16H 61/47* (2010.01)
*B60K 6/46* (2007.10)
*B64F 1/22* (2006.01)
*B64F 1/10* (2006.01)
*F16H 61/472* (2010.01)
*B60W 10/06* (2006.01)
*B60W 20/00* (2006.01)
*B60W 10/08* (2006.01)
*B60W 30/18* (2012.01)
*B60L 11/12* (2006.01)

(52) U.S. Cl.
CPC ............ *B60W 30/18* (2013.01); *B60W 30/188* (2013.01); *F16H 61/47* (2013.01); *B60W 2720/30* (2013.01); *B60W 2710/083* (2013.01); *B60W 2710/081* (2013.01); *B60K 6/46* (2013.01); *B64F 1/22* (2013.01); *B64F 1/10* (2013.01); *F16H 61/472* (2013.01); *B60L 2240/421* (2013.01); *B60W 10/06* (2013.01); *B60W 2720/28* (2013.01); *B60W 20/00* (2013.01); *Y02T 10/6217* (2013.01); *B60W 10/08* (2013.01); *B60L 2240/486* (2013.01); *Y02T 10/642* (2013.01); *B60W 2710/1033* (2013.01); *B60L 2240/423* (2013.01); *B60L 2220/42* (2013.01); *B60L 11/12* (2013.01); *Y10S 903/93* (2013.01); *B60W 2710/0677* (2013.01); *Y02T 10/6286* (2013.01)
USPC ................ 701/93; 701/22; 180/170; 903/930

(58) Field of Classification Search
USPC ..................... 701/22, 36, 69, 70, 93, 110, 84; 180/170
See application file for complete search history.

(56) References Cited

U.S. PATENT DOCUMENTS

| | | | |
|---|---|---|---|
| 296,622 A | 4/1884 | Reno | |
| 2,539,010 A | 1/1951 | Cox | |
| 2,751,990 A | 6/1956 | Finlay at al | |
| 2,957,650 A | 10/1960 | Horan et al. | |
| 2,966,222 A | 12/1960 | Lambert, Jr. | |
| 3,064,746 A * | 11/1962 | Williamson | 180/54.1 |
| 3,279,722 A | 10/1966 | Glover, Jr. et al | |
| 3,610,363 A | 10/1971 | Hartley | |
| 4,007,890 A | 2/1977 | Bremer et al. | |
| 4,036,384 A | 7/1977 | Johnson | |
| 4,113,041 A | 9/1978 | Birkeholm | |
| 4,122,960 A | 10/1978 | Bauer et al. | |
| 4,225,279 A | 9/1980 | Boyer | |
| 4,237,994 A | 12/1980 | McColl | |
| 4,375,244 A | 3/1983 | Morin | |
| 4,482,961 A | 11/1984 | Kilner et al. | |
| 4,632,625 A | 12/1986 | Schuller et al. | |
| 4,658,924 A | 4/1987 | Dobbie | |
| 4,730,685 A | 3/1988 | Sinkkonen | |
| 4,745,410 A | 5/1988 | Schuller et al. | |
| 4,810,157 A | 3/1989 | Schopf | |
| 4,836,734 A | 6/1989 | Pollner et al. | |
| 4,842,220 A | 6/1989 | Versteeg | |
| 4,911,603 A | 3/1990 | Pollner et al. | |
| 4,911,604 A | 3/1990 | Pollner et al. | |
| 4,913,253 A | 4/1990 | Bowling | |
| 4,917,563 A | 4/1990 | Pollner et al. | |

| | | | | | | |
|---|---|---|---|---|---|---|
| 4,917,564 A | 4/1990 | Pollner et al. | | DE | 4009419 A1 | 9/1991 |
| 4,923,253 A | 5/1990 | Pollner et al. | | DE | 4102861 A1 | 8/1992 |
| 4,950,121 A | 8/1990 | Meyer et al. | | DE | 4131649 A1 | 3/1993 |
| 4,976,499 A | 12/1990 | Guichard et al. | | DE | 4324211 A1 | 1/1995 |
| 4,994,681 A | 2/1991 | Mann | | DE | 4340919 A1 | 3/1995 |
| 4,997,331 A | 3/1991 | Grinsted et al. | | DE | 4446047 A1 | 7/1996 |
| 5,013,205 A | 5/1991 | Schardt | | DE | 4446048 A1 | 7/1996 |
| 5,048,625 A | 9/1991 | Birkeholm | | DE | 3844744 C2 | 5/1997 |
| 5,051,052 A | 9/1991 | Franken et al. | | DE | 19734238 A1 | 2/1998 |
| 5,054,714 A | 10/1991 | Franken et al. | | DE | 102008025683 A1 | 7/2009 |
| 5,078,340 A | 1/1992 | Anderberg | | EP | 0235845 A1 | 9/1987 |
| 5,082,082 A | 1/1992 | Hvolka | | EP | 0649787 | 4/1995 |
| 5,110,067 A | 5/1992 | Sinkkonen | | EP | 0649787 A1 | 4/1995 |
| 5,151,003 A | 9/1992 | Zschoche | | EP | 1190947 A1 | 3/2002 |
| 5,176,341 A | 1/1993 | Ishikawa et al. | | EP | 1623924 A1 | 2/2006 |
| 5,202,075 A | 4/1993 | Barnard et al. | | EP | 1634808 A1 | 3/2006 |
| 5,219,033 A | 6/1993 | Pollner et al. | | FR | 2581965 A1 | 11/1986 |
| 5,259,572 A | 11/1993 | Franken et al. | | FR | 2675919 A1 | 10/1992 |
| 5,261,778 A | 11/1993 | Zschoche | | FR | 2911658 A1 | 7/2008 |
| 5,302,074 A | 4/1994 | Elfstrom | | GB | 1249465 A | 10/1971 |
| 5,302,075 A | 4/1994 | Zschoche | | JP | 56-2237 A | 1/1981 |
| 5,302,076 A | 4/1994 | Bammel et al. | | JP | 57-70741 A | 5/1982 |
| 5,308,212 A | 5/1994 | Pollner et al. | | JP | 2-279497 | 11/1990 |
| 5,314,287 A | 5/1994 | Wichert | | JP | 2001505512 A | 4/2001 |
| 5,336,037 A | 8/1994 | Cürten et al. | | JP | 2003189412 A * | 7/2003 |
| 5,346,354 A | 9/1994 | Hellstrom | | JP | 4138997 B2 | 8/2008 |
| 5,381,987 A | 1/1995 | Carns | | RU | 2271316 | 3/2006 |
| 5,480,274 A | 1/1996 | Franken et al. | | RU | 2271316 C2 | 3/2006 |
| 5,511,926 A | 4/1996 | Iles | | RU | 2302980 C2 | 7/2007 |
| 5,516,252 A | 5/1996 | Francke et al. | | WO | 8500790 A1 | 2/1985 |
| 5,549,436 A | 8/1996 | Fresia | | WO | 8903343 A1 | 4/1989 |
| 5,562,388 A | 10/1996 | Le Gall et al. | | WO | 9011932 A1 | 10/1990 |
| 5,655,733 A | 8/1997 | Roach | | WO | 9313985 A1 | 7/1993 |
| 5,680,125 A | 10/1997 | Elfstrom et al. | | WO | 9826822 | 6/1998 |
| 5,860,785 A | 1/1999 | Eberspacher | | WO | 9852822 A1 | 11/1998 |
| 6,209,671 B1 | 4/2001 | Klein et al. | | WO | 2004028903 A1 | 4/2004 |
| 6,283,696 B1 | 9/2001 | Trummer et al. | | WO | 2004114252 A1 | 12/2004 |
| 6,301,529 B1 * | 10/2001 | Itoyama et al. ............... 701/22 | | WO | 2008038270 A2 | 4/2008 |
| 6,305,484 A1 | 10/2001 | Leblanc | | WO | 2008139437 A1 | 11/2008 |
| 6,352,130 B2 | 3/2002 | Klein et al. | | WO | 2008139440 A2 | 11/2008 |
| 6,352,318 B1 * | 3/2002 | Hosomi et al. ............ 303/139 | | WO | 2009083221 A1 | 7/2009 |
| 6,357,989 B1 | 3/2002 | Iles | | WO | 2010012261 A2 | 2/2010 |
| 6,390,762 B1 | 5/2002 | Peery et al. | | | | |
| 6,405,975 B1 | 6/2002 | Sankrithi et al. | | | | |
| 6,543,790 B2 | 4/2003 | Johnson | | | | |
| 6,600,992 B2 | 7/2003 | Dow | | | | |
| 6,675,920 B1 | 1/2004 | Diez et al. | | | | |
| 6,739,822 B2 | 5/2004 | Johansson | | | | |
| 6,751,588 B1 | 6/2004 | Menendez-Pidal et al. | | | | |
| 6,923,281 B2 | 8/2005 | Chernoff et al. | | | | |
| 6,945,354 B2 | 9/2005 | Goff | | | | |
| 8,181,725 B2 | 5/2012 | Andres et al. | | | | |
| 8,333,069 B2 | 12/2012 | Heren et al. | | | | |
| 2002/0010538 A1 | 1/2002 | Uchida | | | | |
| 2002/0173904 A1 | 11/2002 | Dow | | | | |
| 2003/0047362 A1 | 3/2003 | Chernoff et al. | | | | |
| 2003/0095854 A1 | 5/2003 | Abela | | | | |
| 2005/0196256 A1 | 9/2005 | Rodenkirch et al. | | | | |
| 2006/0056949 A1 | 3/2006 | Eckert | | | | |
| 2006/0278756 A1 | 12/2006 | Marshall | | | | |
| 2007/0227792 A1 | 10/2007 | Yonemori et al. | | | | |
| 2009/0183499 A1 * | 7/2009 | Boorse ....................... 60/295 | | | | |
| 2009/0265065 A1 | 10/2009 | Ikari | | | | |
| 2010/0043423 A1 | 2/2010 | Heren | | | | |
| 2010/0262322 A1 * | 10/2010 | Yokouchi et al. ............ 701/22 | | | | |
| 2011/0127366 A1 | 6/2011 | Becker | | | | |
| 2011/0183809 A1 * | 7/2011 | Rangaraju et al. ........... 477/120 | | | | |

FOREIGN PATENT DOCUMENTS

| | | |
|---|---|---|
| CN | 2458238 Y | 11/2001 |
| CN | 1511759 A | 7/2004 |
| DE | 3327628 A1 | 2/1985 |
| DE | 3327629 A1 | 2/1985 |
| DE | 3521429 A1 | 12/1986 |
| DE | 3534045 A1 | 4/1987 |
| DE | 3928854 A1 | 3/1991 |
| DE | 4007610 A1 | 9/1991 |

OTHER PUBLICATIONS

International Preliminary Report on Patentability Chapter I published Dec. 4, 2012 for PCT/IL2011/000416.
Written Opinion of the International Search Authority published Nov. 30, 2012 for PCT/IL2011/000416.
International Search Report published Dec. 8, 2011 for PCT/IL2011/000416.

* cited by examiner

*Primary Examiner* — Mary Cheung
*Assistant Examiner* — Rodney Butler
(74) *Attorney, Agent, or Firm* — Dorsey & Whitney LLP

(57) ABSTRACT

A primary controller disclosed. The primary controller is configured for controlling operation of a drive system comprising a prime mover, a generator, and a motor, wherein the prime mover is configured to provide energy to the generator, which is configured to drive the motor. The controller comprises a speed controller configured for determining a target speed of the motor dependent on externally-supplied speed input and a torque controller configured for determining a target torque of the motor based on externally-supplied torque input and on parameters of the vehicle. The primary controller is configured to simultaneously determine the target speed and the target torque and to simultaneously control the prime mover, generator, and motor to operate the motor at the target speed and the target torque.

18 Claims, 2 Drawing Sheets

CONTROLLER FOR A DRIVE SYSTEM

FIELD OF THE INVENTION

This invention relates to vehicles powered by hydraulic drive systems, and more particularly to control systems therefor.

BACKGROUND OF THE INVENTION

Typically, a drive system for a vehicle comprises a prime mover (such as a diesel engine), usually outputting constant power, and which powers a generator, which in turn drives motors in each of the vehicle wheels. System speed of response, maneuverability and varying conditions are usually not of concern. When such a drive system carries a load having multiple degrees of freedom, with resonant frequencies lower than that of the drive system itself, maneuvering of the vehicle is difficult if not impossible.

SUMMARY OF THE INVENTION

A controller is provided which controls both the vehicle speed and traction force at the same time, by using controllable variable displacement hydraulic motors. This is accomplished by having a speed controller which controls the speed of the vehicle by controlling several system inputs, and a traction force controller to determine the traction force of the vehicle controlling same inputs, as well as based on control of parameters of the vehicle. To accomplish this, each of the two controllers controls the prime mover RPM, the hydraulic pump displacement, and the hydraulic motor displacement to drive the vehicle. The measured RPM of the prime mover is used as feedback for the speed controller, the measured vehicle speed is used as feedback for both the speed controller and the traction force controller, and the measured drive pressure of the hydraulic system of the vehicle is used as feedback for the traction force controller.

Vehicle speed, acceleration and traction force are governed simultaneously by a controller which constantly controls dynamically all vehicle moving parameters, the prime mover speed, the vehicle speed and traction, in real time. The overall system control is accomplished by having a speed controller which controls the speed of the vehicle based on user desired speed input, and a force controller to determine the acceleration to reach the desired speed and the traction force of the vehicle based on user input and a force envelope, road conditions, parameters of the vehicle, and induced structural limitations, while taking the current speed of the vehicle into account. To accomplish this, each of the two controllers controls the prime mover, the hydraulic pump, and the hydraulic motor to drive the vehicle. The measured RPM of the prime mover is used as feedback for the speed controller, and compared to desired power output. The measured vehicle speed is used as feedback for both the speed controller and the force controller, and the measured acceleration and traction force (which can be measured by any one of several known methods) of the vehicle is used as feedback for the force controller. The invention enables the real time control of hydraulically driven vehicles, utilizing varying governing rules according to the specific requirement and as function of varying conditions, typically impossible today.

According to one aspect of the presently disclosed subject matter, there is provided a primary controller configured for controlling operation of a drive system comprising a prime mover, a generator, and a motor, wherein the prime mover is configured to provide energy to the generator, which is configured to drive the motor, the controller comprising:
  a speed controller configured for determining a target speed of the motor dependent on externally-supplied speed input; and
  a torque controller configured for determining a target torque of the motor based on externally-supplied torque input and on parameters of the vehicle;
wherein the primary controller is configured to:
  simultaneously determine the target speed and the target torque; and
  simultaneously control the prime mover, generator, and motor to operate the motor at the target speed and the target torque.

The speed controller may be further configured to determine the target speed dependent on the power output of the prime mover and on the measured actual speed of the motor, with the torque controller being further configured to determine the target torque based on the measured actual speed and the measured actual torque of the motor.

According to another aspect of the presently disclosed subject matter, there is provided a primary controller being configured for controlling operation of a vehicle driven by a drive system, the controller comprising:
  a speed controller configured for determining a target speed of the vehicle dependent on externally-supplied speed input; and
  a traction force controller configured for determining target traction force and acceleration of the vehicle based on externally-supplied traction input and on parameters of the vehicle;
wherein the primary controller is configured to:
  simultaneously determine the target speed, acceleration, and traction force; and
  simultaneously control a prime mover, generator, and motor of the drive system to drive the vehicle at the target speed, acceleration, and traction force.

The speed controller may be further configured to determine the target speed of the vehicle dependent on the power of prime mover and on the measured actual speed of the vehicle, with the traction force controller being further configured to determine the target traction force of the vehicle based on the measured actual speed and the traction force of the vehicle.

The measured actual speed of the vehicle may be measured by measuring the angular velocity of wheels of the vehicle.

The primary controller may be configured to:
  influence the speed of the vehicle at least by affecting the speed of the motor; and
  influence the traction force of the vehicle at least by affecting the torque of the motor.

According to both of the above aspects, the torque controller may be further configured to determine the target torque dependent on the target speed.

Further according to both of the above aspects, the externally-supplied speed input may comprise a desired user-supplied desired vehicle speed.

Further according to both of the above aspects, the externally-supplied torque input may comprise information regarding maximum and minimum design torques.

Further according to both of the above aspects, the prime mover may be an engine, the primary controller being configured to control the prime mover at least by affecting its speed.

Further according to both of the above aspects, the primary controller may be further configured to mitigate effects on the prime mover, the motor speed, and the motor torque due to force disturbances (such as slopes, wind, and rolling friction) on the vehicle when driven by the drive system.

Further according to both of the above aspects, the drive system may be configured to drive the vehicle when subject to a load, the primary controller being configured to reduce the resonance of the load during operation of the vehicle subject to the load.

Further according to both of the above aspects, the drive system may be an electric drive system. The prime mover may be selected from the group consisting of a diesel engine, one or more batteries, and one or more fuel cells. The generator may be an electric generator. The motor may be an electric motor.

Further according to both of the above aspects, the drive system may be a hydraulic drive system. The prime mover may be a diesel engine. The generator may be a hydraulic pump. The primary controller may be configured to control the hydraulic pump at least by affecting its displacement. The motor may be a hydraulic motor. The primary controller may be configured to control the hydraulic motor at least by affecting its displacement.

According to a further aspect of the presently disclosed subject matter, there is provided a primary controller configured for controlling operation of a drive system comprising a prime mover, a generator, and a motor, wherein the prime mover is configured to provide energy to the generator, which is configured to drive the motor, the controller comprising:
 a speed controller configured for determining a target speed of the motor dependent on at least two different input parameters; and
 a torque controller configured for determining a target torque of the motor based on at least two different input parameters;
wherein the primary controller is configured to:
 simultaneously determine the target speed and torque; and
 simultaneously control the prime mover, generator, and motor to operate the motor at the target speed and the target torque.

The input parameters can be measured input parameters selected from the group consisting of power output of the prime mover, measured actual speed of the vehicle, measured speed of the hydraulic motor, and measured actual traction force of the vehicle.

The input parameters can be user input parameters selected from the group consisting of user-supplied desired speed, the maximum acceleration by which the desired speed may be reached, user-supplied torque, information regarding a maximum and a minimum design torque, desired motor speed, parameters of the vehicle (e.g., dimensions and weight of the vehicle), and parameters of the actual load maneuvered by the vehicle.

The input parameters can be external input parameters selected from the group consisting of locations other vehicles, slope of the road, wind, and rolling friction.

The at least two different input parameters can comprise at least one parameter from each of two or more of the measured input parameters, the user input parameters, and the external input parameters.

According to a still further aspect of the presently disclosed subject matter, there is provided a vehicle comprising a primary controller according to any one of the preceding claims. The vehicle may be configured to tow an aircraft, and may be further configured to receive a landing gear of the aircraft.

BRIEF DESCRIPTION OF THE DRAWINGS

In order to understand the invention and to see how it may be carried out in practice, an embodiment will now be described, by way of a non-limiting example only, with reference to the accompanying drawings, in which.

DETAILED DESCRIPTION OF EMBODIMENTS

Figure 1A:
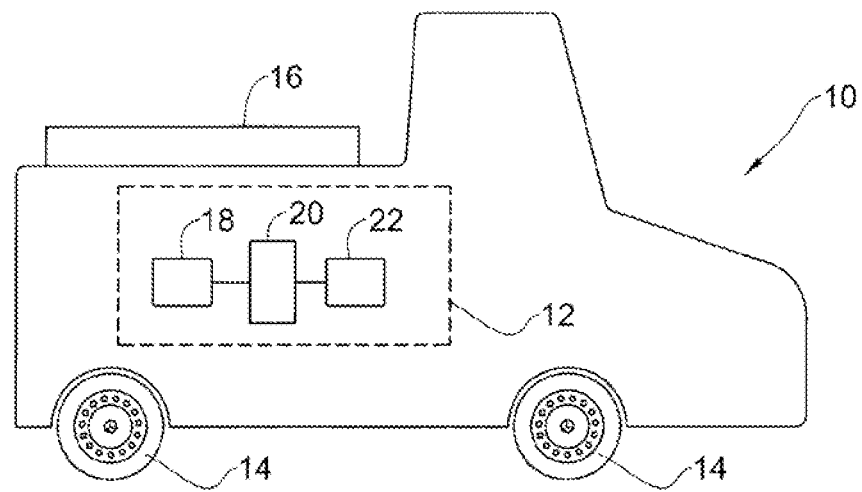
FIG. 1A is a schematic illustration of a vehicle having a drive system.

As schematically illustrated in FIG. 1A, there is provided a vehicle 10, which is powered by a drive system 12 designed to drive the vehicle. The vehicle 10 further comprises wheels 14 for moving the vehicle, and a platform 16 for carrying a load, which may be a landing gear (not illustrated) of an airplane, such as a commercial airliner. In addition, a controller (not illustrated in FIG. 1) is provided to control the operation of the vehicle via the drive system 12.

In addition to the above, the vehicle 10 may be an aircraft towing vehicle, and thus be provided with suitable elements therefore. Examples of some of such vehicles and elements are disclosed, for example, in one or more of WO 2008/038270, WO 2008/139437, and WO 2008/139440, the entire disclosures of which are incorporated herein by reference.

The drive system 12 comprises a prime mover 18 (such as a diesel engine), a generator 20, and a motor 22 associated with, and configured to drive, each wheel 14 of the vehicle 10. (It will be appreciated that although the drive system 12 is described as having one prime mover 18 and one generator 20, it may comprise several of these elements, for example to provide redundancy.) The drive system 12 is similar to those known in the art. In particular, the prime mover 18 provides power to the generator 20, which drives each motor 22. As mentioned, the motor 22 is functionally connected the wheels 14 to power them.

The platform 16 is connected with a chassis of the vehicle 10 with known spring and damping characteristics as part of the multi degrees of freedom load. These parameters may be measured and/or estimated empirically by any known means. In addition, appropriate connectors, such as springs and/or dampers may be provided between the platform 16 and the chassis of the vehicle 10 in order to provide desired characteristics, depending on the load.

The platform 16 is typically designed to carry a heavy load having multiple degrees of freedom. For example, the vehicle 10 may be configured to tow an aircraft (such as a commercial jumbo-jet), in which case the platform 16 may be designed to carry a landing gear, such as the nose landing gear, of the aircraft.

Figure 2:
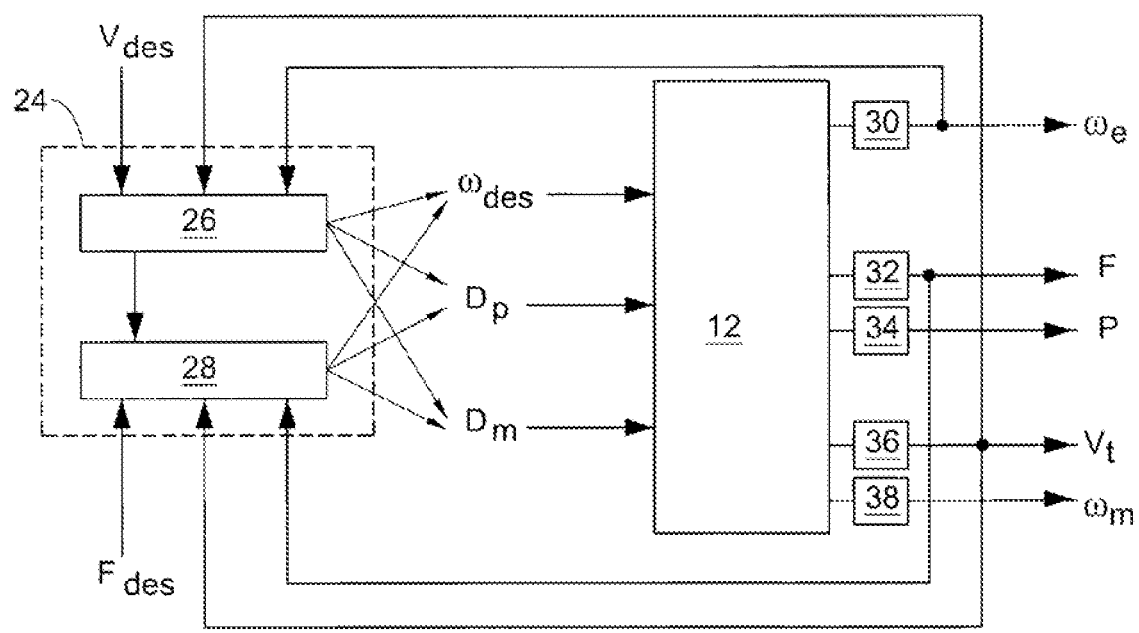
FIG. 2 is a schematic illustration of a primary controller according to the present invention.

The vehicle 10 is further provided with a primary controller, one example of which is schematically illustrated in FIG. 2 and designated at 24. The primary controller 24 comprises a speed controller 26, configured to determine a target speed (i.e., a speed at which the speed controller calculates the vehicle could operate most ideally, taking into account inputs and calculating as detailed below) of the vehicle, and a force controller 28, configured to determine target acceleration and target traction force (i.e., acceleration and traction force at which the force controller calculates the vehicle could operate most ideally, taking into account inputs and calculating as detailed below) of the vehicle. (It will be appreciated that while the term "force controller" is used with reference to the specific example of a vehicle, it is equivalent to a torque controller which may be used by a primary controller designed to control operations of an HDS designed to drive something other than a vehicle, such as lifting equipment, an antenna, etc.)

The speed controller 26 is configured to determine the target speed, taking into account several inputs, which may include:
- a user-supplied desired speed ($V_{des}$, for example regarding the desired vehicle speed (this may be provided via a computer interface, or by a traditional foot-pedal);
- the maximum acceleration by which the desired speed may be reached;
- the power output of the prime mover 18; and
- the actual speed of the vehicle 10 (for example by measuring the angular velocity of the wheels of the vehicle).

The force controller 28 is configured to determine the target acceleration and traction force, taking into account several inputs, which may include:
- a user-supplied traction input ($F_{des}$, this may include maximum and minimum design vehicle traction forces provided in advance by a designer);
- parameters of the vehicle (e.g., dimensions and weight of the vehicle);
- parameters of the actual load maneuvered by the vehicle
- the actual speed of the vehicle 10;
- the target speed determined by the speed controller 26;
- the actual traction force of the vehicle 18.

The primary controller 24 is configured to determine the target speed, acceleration, and traction force simultaneously, and to control the prime mover 18, generator 20, and motors 22 simultaneously to implement the target values. For optimal vehicle performance, the primary controller 24 may direct operation of the drive system 12 such that the power output of the vehicle 10 (i.e., traction force×speed) is as close as possible to that of the prime mover 18 at all times.

In order to implement the target values, the primary controller 24 is configured to affect the power output of the prime mover 18, and the operations of the generator 20 and motors 22.

In addition to the above, the primary controller 24 may be configured to detect and mitigate the effects of external forces which are due to disturbances on the vehicle 10. These disturbances may include slopes of the road on which the vehicle travels, the effect of wind on the vehicle and/or the load, and the effects of rolling friction of the vehicle and the towed load.

Figure 1B:
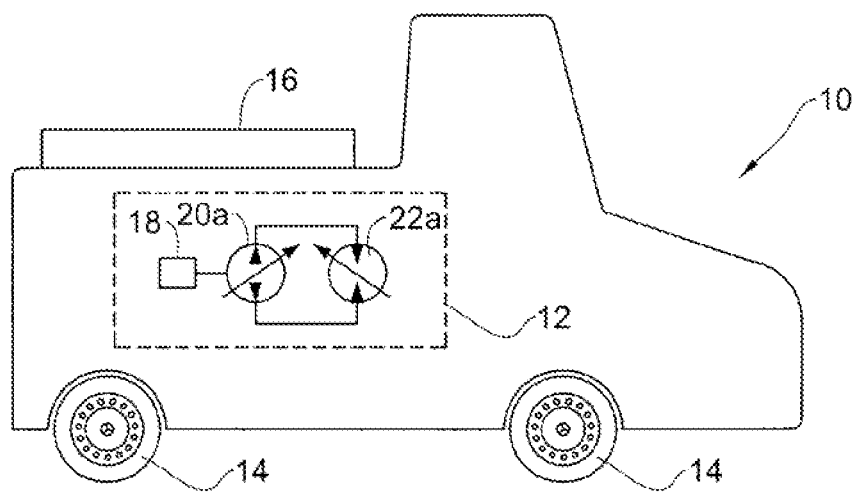
FIG. 1B is a schematic illustration of the vehicle illustrated in FIG. 1A with a hydraulic drive system.

According to one example, which is illustrated in FIG. 1B, the drive system 12 is a hydraulic drive system (HDS). The prime mover 18 may be any suitable prime mover, such as a diesel engine. The generator 20 may be a variable displacement hydraulic pump 20a, and the motors 22 may be variable displacement hydraulic motors 22a. According to such an arrangement, the power output of the prime move is related to its speed, and the hydraulic pump supplies hydraulic fluid to the hydraulic motors.

It will be appreciated that, as is well known, the speed of the vehicle 10 is associated with the speed of the hydraulic motor, and the traction force thereof is associated with the torque of the hydraulic motor thereof.

The primary controller 24 may be further configured to maintain system stability by reducing the resonant frequencies of the load, so that it does not approach the system bandwidth of the drive system 12. If the resonance of the load were to approach or lower than that of the system bandwidth of the drive system 12, control of the vehicle 10 would be lost and difficult to regain.

By analyzing the load dynamics, vehicle and drive system dynamics, and control system dynamics, the system state space may be defined by the following twelve variables:

$X_1 = X_p$ (platform displacement)  $X_2 = X_1^* = V_p$ (platform velocity)
$X_3 = X_t$ (vehicle displacement)  $X_4 = X_3^* = V_t$ (vehicle velocity)
$X_5 = \omega_e$ (engine speed RPM)  $X_6 = P$ (hydraulic system pressure)
$X_7 = D_p$ (pump displacement)  $X_8 = X_7^* = D_p^*$ (Pump displacement rate)
$X_9 = D_m$ (motor displacement)  $X_{10} = X_9^* = D_m^*$ (Motor displacement rate)
$X_{11} = P_{c1}$ ($D_p$ control pressure)  $X_{12} = P_{c2}$ ($D_m$ control pressure)

The system is further defined by the following variables:
System inputs . . . $\omega_{des}$ (desired speed); $eV_p$; $eV_n$, (pump & motor control)
System outputs . . . $V_t$ ($X_4$); $\omega_e$ ($X_5$); $P$ ($X_6$); $P_{c1}$ ($X_{11}$); $P_{c2}$ ($X_{12}$)
System disturbance . . . (fast) $F_{load}$
System disturbance (slow) . . . $F_{disturb}$ ($F_{roll}+F_{slope}+F_{wind}$)
Constant parameter (in control loop) . . . $F_{preload\ pump}$ (pump spring preload)
Constant parameter (in control loop) . . . $F_{preload\ motor}$ (motor spring preload)

The state space equations are as follows (it will be appreciated that $X_5^*$ is the first input, $X_{11}^*$ is the second input, and $X_{12}^*$ is the third input to the system):

$$X_1^* = X_2$$

$$X_2^* = -(K_p/M_p)X_1 - (B_p/M_p)X_2 + (K_p/M_p)X_3 + (B_p/M_p)X_4 - F_{load}/M_p$$

$$X_3^* = X_4$$

$$X_4^* = D_{m0}(r/RM_t)X_6 + P_0(r/RM_t)X_9 - (B_m/M_t)X_4 - (B_p/M_t)X_4 - (K_p/M_t)X_3 + (K_p/M_t)X_1 + (B_p/M_t)X_2 - F_{disturb}/M_t$$

$$X_5^* = -(K_e/J_e)X_5 - (D_{p0}/J_e)X_6 - (P_0/J_e)X_7 + (K_e/J_e)\omega_{des}$$

$$X_6^* = D_{p0}(\beta_e/V_0)X_5 + \omega_{e0}(\beta_e/V_0)X_7 - (C_t\beta_e/V_0)X_6 - D_{m0}(r/R)(\beta_e/V_0)X_4 - \omega_{m0}(\beta_e/V_0)X_9$$

$$X_7^* = X_8$$

$$X_8^* = (Ac_pK_{pump}/M_pC_p)X_{11} - (Bc_p/M_pC_p)X_8 - (Kc_p/M_pC_p)X_7 - (K_{pump}F_{prep}/M_pC_p)$$

$$X_9^* = X_{10}$$

$$X_{10}^* = (Ac_mK_{motor}/M_mc)X_{12} - (B_m/M_mc_m)X_{10} - (K_m/M_mc)X_9 - (K_{motor}F_{prem}/M_mc)$$

$$X_{11}^* = K_e(\beta_e/V_0)eV_p - Ac_p(\beta_e/V_0K_{pump})X_8 - (C+K_p)(\beta_e/V_0)X_{11}$$

$$X_{12}^* = K_e(\beta_e/V_0)eV_m - Ac_m(\beta_e/V_0K_{motor})X_{10} - (C+K_p)(\beta_e/V_0)X_{12}$$

where:
$B_p$=damper damping
$C_t$=total hydraulic system leakage
$F_{disturb}$=summation of all disturbing forces
$F_{load}$=force due to the load
$K_p$=damper stiffness
$M_p$=mass of the load
$M_t$=mass of the vehicle
$V_0$=volume of hydraulic fluid
$\beta_e$=bulk modulus of hydraulic fluid
$\omega_{des}$=desired speed of prime mover
$D_{m0}, D_{p0}, \omega_{e0}, \omega_{m0}$, and $P_0$ are system operating point values
R is the gear ratio
R is the wheel radius
$J_e$ and $K_e$ are diesel engine inertia and control gain constant $K_{pump}$, $K_{motor}$, $K_m$, $K_p$, $F_{prep}$, and $F_{prem}$, are pump and motor controller parameters $M_m$, $M_p$, $B_m$, $c_m$, $c_p$, are pump and motor controller piston parameters In addition, the state space is defined as follows:

| Governing equations: | $X^* = AX + Bu$ | $Y = CX + Du$ | |
|---|---|---|---|
| State variables: | X: n × n | u: m × 1 | Y: 1 × 1 |
| State matrices: | A: n × m | B: 1 × m | C: 1 × n  D: 1 × m |

By utilizing the above description of the system state space notation, y=f(u), $D_p$, $D_m$, and $\omega_{des}$ are used as a basis for the primary controller 24 inputs to operate the vehicle 10 by controlling $\omega_e$, $V_t$, and P as system outputs. Any known numerical computing environment, for example as sold under the name MATLAB® (with or without Simulink®), can be used to develop an open loop transfer function G(s).

The open loop transfer function is solved in order to obtain the dynamic behavior of the system (i.e., its dominant poles). At the same time, a parameter and order of magnitude analysis is performed in order to eliminate insignificant elements and neglect fast responding dynamics, thus simplifying state matrices A, B, and C. For example, pump and motor valve control system may be designed such that they are fast enough so that their dynamic responses and related swashplate (pump and motor) movements are fast relative to input servo-valve voltage and can be regarded as pure gain.

Likewise, slow-changing disturbance loads (e.g., wind and slope) and control piston spring preload coefficient (pump and motor) may be disregarded.

As further illustrated in FIG. 2, the speed controller 26 and force controller 28 control the displacement of the hydraulic pump 20*a* ($D_p$), the displacement of the hydraulic motor 22*a* ($D_m$), and the desired speed of the prime mover 18 ($\omega_{des}$), which are implemented via the HDS 12. This affects, inter alia, the actual speed of the prime mover 18 ($\omega_e$), the traction of the vehicle (F), the pressure of the HDS (P), the velocity of the vehicle 10 ($V_t$), and the speed of the hydraulic motor ($\omega_m$). It will be appreciated that the vehicle may be supplied with one or more instruments to measure these values, for example a prime mover speed sensor 30, a vehicle traction sensor 32, an HDS pressure sensor 34, a vehicle velocity sensor 36, and a motor speed sensor 38. Each of these may be provided for example as is known in the art.

In particular, the speed controller 26 may be configured to determine the target speed and/or to determine how to control the displacement of the hydraulic pump 20*a* ($D_p$), the displacement of the hydraulic motor 22*a* ($D_m$), and the desired speed of the prime mover 18 ($\omega_{des}$), based on the power output of the prime mover (which is predictably related to the actual speed $\omega_e$ thereof) and the measured actual speed of the hydraulic motor $\omega_m$. In addition, the force controller may be configured to determine the target torque and/or to determine how to control the displacement of the hydraulic pump 20*a* ($D_p$), the displacement of the hydraulic motor 22*a* ($D_m$), and the desired speed of the prime mover 18 ($\omega_{des}$), based on the measured actual speed of the hydraulic motor $\omega_m$ and the measured traction of the vehicle F (which relates to the torque of the hydraulic motor 22*a*).

Figure 1C:
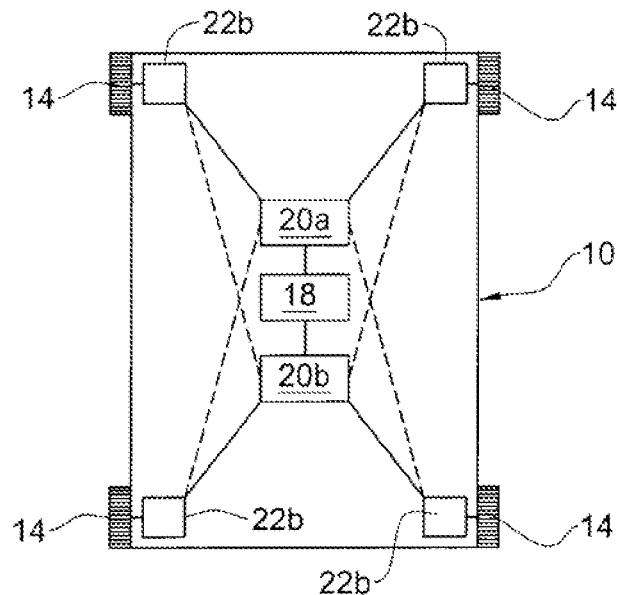
FIG. 1C is a schematic illustration of the vehicle illustrated in FIG. 1A with an electric drive system.

According to another example, which is illustrated in FIG. 1C, the drive system 12 is an electric drive system. The prime mover 18 may be any suitable prime mover, such as a diesel engine. The generator 20 may be an electric generator 20*b*, and the motors 22 may be any suitable types of electric motors 20*b*. It will be appreciated that the speed and torque of the electric motors 22*b* may be controlled in any suitable way, depending on the type of electric motor provided, as is well known.

An open loop transfer function for the electric drive system may be determined similar to as described above, mutatis mutandis.

It will be appreciated that the example illustrated in FIG. 1C comprises more than one electric generators 20*b*, each of which drives one or more electric motors 20*b*, as indicated by sold lines. In such a case, each electric generator 20*b* may be further connected to the electric motors 22*b* which are driven by one or more other electric generators, as indicated by dashed lines. Thus, if one of the electric generators 20*b* should fail, one or more of the others can be automatically configured to drive the electric motor(s) 22*b* which had previously been driven by the failed electric generator. Thus, the drive system 12 is provided with a redundancy. The vehicle may comprise a single prime mover 12 as illustrated, or more than one (e.g., one associated with each electric generator 20*b*).

Providing an electric drive system as disclosed herein may have several advantages. For example, such a system facilitates operating the vehicle 10 at slow speeds. In the event that the vehicle is an airplane towing vehicle, this allows for pushback operations to be performed by the vehicle 10. In addition, the drive system 12 is afforded a high degree of control, which helps protect the nose landing gear of the airplane, which is typically the element thereof to which the vehicle 10 applies direct force, from damage due to high loads.

It will be appreciated that by providing a primary controller 24 which operates as described above allows multiple inputs to be used to determine multiple outputs simultaneously.

Those skilled in the art to which this invention pertains will readily appreciate that numerous changes, variations and modifications can be made without departing from the scope of the invention mutatis mutandis. For example, the primary controller may be configured for use, mutatis mutandis, with any type of system driven by an HDS and subject to a multi-degree of freedom load, such as construction and/or lifting equipment, antennas, etc.

The invention claimed is:

1. A vehicle configured to tow an airplane driven by a drive system, the vehicle comprising:
   a primary controller being configured for controlling operation of the vehicle for towing the airplane, the primary controller including:
      a speed controller configured for determining a target speed of the vehicle dependent on externally-supplied speed input, the power of the prime mover, and the measured actual speed of the vehicle; and
      a force controller configured for determining target traction force and acceleration of the vehicle based on externally-supplied traction input, parameters of the vehicle, the measured actual speed, and the traction force of the vehicle;
   wherein the primary controller is configured to:
      simultaneously determine the target speed, acceleration, and traction force; and
      simultaneously control a prime mover, generator, and motor of the drive system to drive the vehicle at the target speed, acceleration, and traction force.

2. A primary controller configured for controlling operation of a vehicle for towing an airplane driven by a drive system comprising a prime mover, a generator, and a motor, wherein the prime mover is configured to provide energy to the generator, which is configured to drive the motor, the controller comprising:
    a speed controller configured for determining a target speed of the motor dependent on externally-supplied speed input, the power output of the prime mover, and the measured actual speed of the motor; and
    a torque controller configured for determining a target torque of the motor based on externally-supplied torque input, parameters of the vehicle, the measured actual speed, and the measured actual torque of the motor;
    wherein the primary controller is configured to:
        simultaneously determine the target speed and the target torque; and
        simultaneously control the prime mover, generator, and motor to operate the motor at the target speed and the target torque.

3. The primary controller according to claim 2 any one of the preceding claims, wherein said torque controller is further configured to determine the target torque dependent on the target speed.

4. The primary controller according to claim 2, wherein said externally-supplied speed input comprises a desired user-supplied desired vehicle speed.

5. The primary controller according to claim 2, wherein said externally-supplied torque input comprises information regarding maximum and minimum design torques.

6. The primary controller according to claim 2, wherein said prime mover is an engine, said primary controller being configured to control the prime mover at least by affecting the speed of the prime mover.

7. The primary controller according to claim 2, being further configured to mitigate effects on the prime mover, the motor speed, and the motor torque due to force disturbances on the vehicle when driven by the drive system.

8. The primary controller according to claim 7, wherein said disturbances are selected from the group including slopes, wind, and rolling friction.

9. The primary controller according to claim 2, wherein said drive system is configured to drive the vehicle when subject to a load, said primary controller being configured to reduce the resonance of the load during operation of the vehicle subject to said load.

10. A primary controller being configured for controlling operation of a vehicle for towing an airplane driven by a drive system, the controller comprising:
    a speed controller configured for determining a target speed of the vehicle dependent on externally-supplied speed input, the power of the prime mover, and the measured actual speed of the vehicle; and
    a force controller configured for determining target traction force and acceleration of the vehicle based on externally-supplied traction input, parameters of the vehicle, the measured actual speed, and the traction force of the vehicle;
wherein the primary controller is configured to:
    simultaneously determine the target speed, acceleration, and traction force; and
    simultaneously control a prime mover, generator, and motor of the drive system to drive the vehicle at the target speed, acceleration, and traction force.

11. The primary controller according to claim 10, wherein the measured actual speed of the vehicle is measured by measuring the angular velocity of wheels of the vehicle.

12. The primary controller according to claim 10, being configured to:
    influence the speed of the vehicle at least by affecting the speed of the motor; and
    influence the traction force of the vehicle at least by affecting the torque of the motor.

13. The primary controller according to claim 10, wherein said force controller is further configured to determine the target traction force dependent on the target speed.

14. The primary controller according to claim 10, wherein said externally-supplied speed input comprises desired vehicle speed.

15. The primary controller according to claim 10, wherein said externally-supplied fraction input comprises information regarding maximum and minimum design vehicle fraction forces.

16. The primary controller according to claim 10, wherein said prime mover is an engine, said primary controller being configured to control the prime mover at least by affecting a speed thereof.

17. The primary controller according to claim 10, being further configured to mitigate effects on the speed and traction forces due to force disturbances on the vehicle.

18. The primary controller according to claim 10, wherein said vehicle is configured to carry a load, said primary controller being configured to reduce the resonance of the load during operation of the vehicle subject to said load.

\* \* \* \* \*